United States Patent
Ger et al.

(10) Patent No.: US 8,385,090 B2
(45) Date of Patent: Feb. 26, 2013

(54) POWER SUPPLY SYSTEM

(75) Inventors: Chih-Chan Ger, Jhongli (TW);
Tsung-Liang Hung, Jhongli (TW)

(73) Assignee: Ampower Technology Co., Ltd., Jhongli, Taoyuan County (TW)

( * ) Notice: Subject to any disclaimer, the term of this patent is extended or adjusted under 35 U.S.C. 154(b) by 158 days.

(21) Appl. No.: 13/110,929

(22) Filed: May 19, 2011

(65) Prior Publication Data

US 2012/0243262 A1    Sep. 27, 2012

(30) Foreign Application Priority Data

Mar. 21, 2011   (CN) .......................... 2011 1 0067404

(51) Int. Cl.
*H02J 3/00* (2006.01)
*H02M 3/24* (2006.01)
(52) U.S. Cl. ................. 363/34; 363/39; 363/44; 363/95
(58) Field of Classification Search .................... 363/34, 363/37, 39–48, 95–98
See application file for complete search history.

(56) References Cited

U.S. PATENT DOCUMENTS

| | | | | |
|---|---|---|---|---|
| 4,808,906 A * | 2/1989 | Liepe | ............................. | 323/223 |
| 5,438,302 A * | 8/1995 | Goble | ........................... | 331/167 |
| 6,906,473 B2 * | 6/2005 | Alexandrov | ................... | 315/224 |
| 7,545,106 B2 * | 6/2009 | Ger et al. | ........................ | 315/307 |
| 2007/0138971 A1 * | 6/2007 | Chen | ........................... | 315/209 R |

* cited by examiner

*Primary Examiner* — Jessica Han
(74) *Attorney, Agent, or Firm* — Altis Law Group, Inc.

(57) ABSTRACT

A power supply system includes an electromagnetic interference (EMI) filter circuit, a rectifier and filter circuit, a switch circuit, a transformer, a feedback circuit and a controller. The feedback circuit includes a voltage divider circuit, a filter circuit, and a voltage and temperature compensation circuit. The voltage divider circuit generates a voltage dividing signal, and includes a first lossless element and a second lossless element connected in series between an output of the transformer and the ground, and the voltage dividing signal is generated at a node of the first and second lossless elements. The filter circuit filters the voltage dividing signal into a direct current (DC) signal. The voltage and temperature compensation circuit does voltage compensation and temperature compensation to the DC signal to generate a feedback signal, and sends the feedback signal to the controller.

12 Claims, 2 Drawing Sheets

POWER SUPPLY SYSTEM

BACKGROUND

1. Technical Field

The disclosure relates to power supply systems, and particularly to a high voltage direct current power supply system.

2. Description of Related Art

In a high voltage direct current (DC) power supply system, a controller retrieves a feedback signal from a feedback circuit to correspondingly control high voltage DC output of the high voltage DC power supply system. In general, a voltage divider can act as the feedback circuit to divide the high voltage DC output to generate the feedback signal corresponding to the high voltage DC output. However, the voltage divider results in power loss, which increases power loss of the high voltage DC power supply system and decreases efficiency.

In addition, because the output of the high voltage DC power supply system is high voltage DC voltage, the resistors should be high voltage tolerance, which have high costs, to avoid damage of the feedback circuit. Thus, cost of the high voltage DC power supply system is increased.

DETAILED DESCRIPTION

Figure 1:
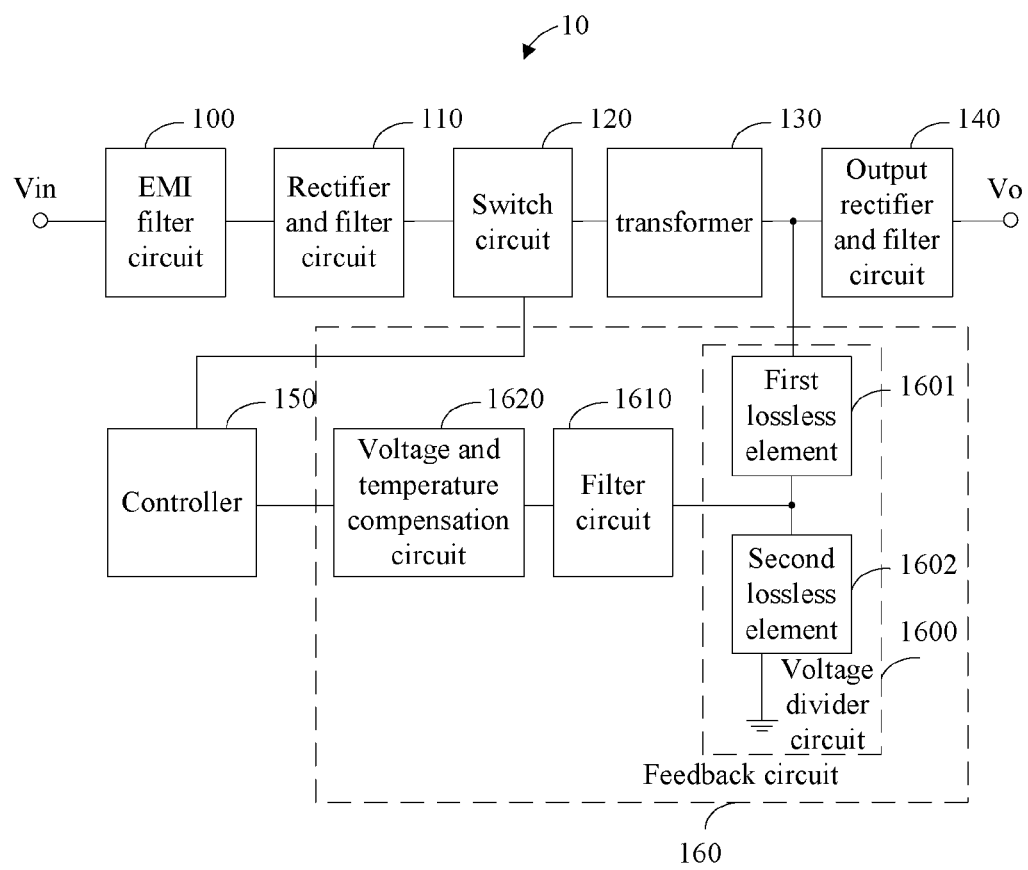
FIG. 1 is a schematic diagram of one embodiment of a power supply system as disclosed.

FIG. 1 is a schematic diagram of one embodiment of a power supply system 10 as disclosed. The power supply system 10 converts an input power supply Vin into output power Vo to drive loads, such as, high voltage direct current (DC) lamps, or laser printers. In this embodiment, the input power supply Vin may be alternating current (AC) power supply of 220V, and the output power Vo may be high voltage DC power, such as, DC power of 1000V. The power supply system 10 includes an electromagnetic interference (EMI) filter circuit 100, a rectifier and filter circuit 110, a switch circuit 120, a transformer 130, and an output rectifier and filter circuit 140, which are connected in series. The power supply system 10 further includes a feedback circuit 160 and a controller 150, and the feedback circuit 160 and the controller 150 are connected between an output of the transformer 130 and the switch circuit 120 in series.

The EMI filter circuit 100 is connected to the input power supply Vin, and filters EMI. The rectifier and filter circuit 110 is connected to the EMI filter circuit 100 and switch circuit 120, and rectifies and filters the input power supply Vin to output DC power signals to the switch circuit 120. The switch circuit 120 converts the DC power signals from the rectifier and filter circuit 110 into first AC power signals. In one embodiment, the first AC power signals may be square wave signals. The switch circuit 120 may be one of a full bridge circuit, a half bridge circuit, a pull-push circuit, for example.

The transformer 130 converts the first AC power signals into second AC power signals. In this embodiment, the second AC power signals may be sine wave signals. The output rectifier and filter circuit 140 rectifies and filters the second AC power signals from the transformer 130 into the high voltage DC output power Vo.

The feedback circuit 160 is connected to the output of the transformer 130 and the controller 150, and generates a feedback signal according to the second AC power signals from the transformer 130 and sends the feedback signal to the controller 150. In one embodiment, the feedback signal reflects voltage of the high voltage DC output power Vo. The controller 150 controls on and off of the switch circuit 120 according to the feedback signal to control amplitude of the first AC power signal, thus, to control the voltage of the high voltage DC output power Vo.

The feedback circuit 160 includes a voltage divider circuit 1600, a filter circuit 1610, and a voltage and temperature compensation circuit 1620. The voltage divider circuit 1600 is connected between the output of the transformer 130 and the ground, and generates a voltage dividing signal according to the second AC power signals from the transformer 130. The voltage divider circuit includes a first lossless element 1601 and a second lossless element 1602 connected between the output of the transformer 130 and the ground in series, and the voltage dividing signal is generated at a node of the first lossless element 1601 and the second lossless element 1602. In one embodiment, because the second AC power signals are AC signals, the voltage dividing signal is also an AC signal. The voltage divider circuit 1600 uses lossless elements 1601 and 1602 to generate the voltage dividing signal, which nearly have no loss, thus, loss of the power supply system 10 is decreased.

The filter circuit 1610 is connected to the node of the first lossless element 1601 and the second lossless element 1602 and the voltage and temperature compensation circuit 1620, and rectifies and filters the voltage dividing signal into a DC signal to feedback to the controller 150. The DC signal from the filter circuit 1610 changes along with change of product batch or temperature. Because the high voltage DC output power Vo is a multiple of the DC signal, the change of the DC signal results in obvious change of the high voltage DC output power Vo, which results in instability of the high voltage DC output power Vo. Therefore, the voltage and temperature compensation circuit 1620 is added to compensate for the voltage and temperature to make the high voltage DC output power Vo stable and to reduce load effect with different output power Vo. The voltage and temperature compensation circuit 1620 does voltage compensation and temperature compensation to the DC signal from the filter circuit 1610 to generate the feedback signal, and sends the feedback signal to the controller 150. Thus, the controller 150 knows a state of the high voltage DC output power Vo according to the feedback signal, and generates corresponding control signals to control the switch circuit 120. In this embodiment, the feedback signal is a DC signal.

Figure 2:
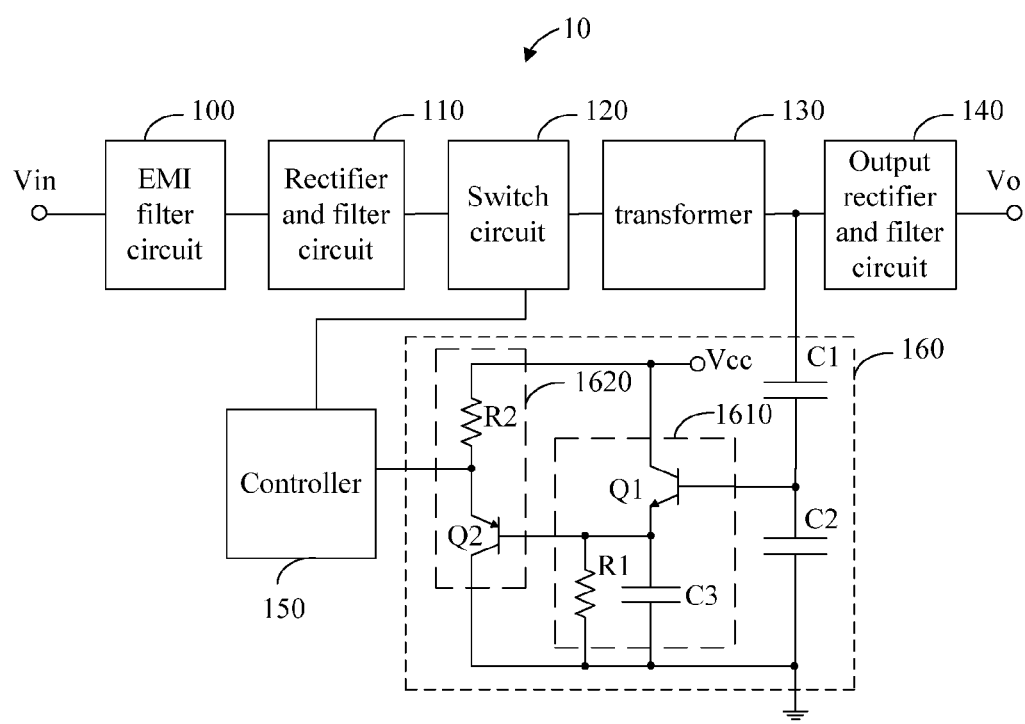
FIG. 2 is a circuit diagram of one embodiment of a power supply system as disclosed.

FIG. 2 is a circuit diagram of one embodiment of the feedback circuit 160 of the power supply system 10. The first lossless element 1601 and the second lossless element 1602, in one example, can both be capacitors, respectively to be a first capacitor C1 and a second capacitor C2. The filter circuit 1610 includes a first switch Q1, a third capacitor C3 and a first resistor R1. The first switch Q1 includes a control pole, a first pole, and a second pole. The control pole of the first switch Q1 is connected between the first capacitor C1 and the second capacitor C2 to receive the voltage dividing signal, the first pole receives a reference voltage Vcc, and the second pole is grounded via the third capacitor C3. The first resistor R1 is connected to the third capacitor C3 in parallel.

The voltage and temperature compensation circuit 1620 includes a second switch Q2 and a second resistor R2. The second switch Q2 includes a control pole, a first pole, and a second pole. The control pole of the second switch Q2 is connected to the second pole of the first switch Q1, the first pole of the second switch Q2 is grounded, and the second pole of the second switch Q2 receives the reference voltage Vcc via the second resistor R2 and outputs the feedback signal to the controller 150.

In one embodiment, the first switch Q1 may be a NPN type transistor, the control pole of the first switch Q1 is a base of the NPN type transistor, the first pole of the first switch Q1 is a collector of the NPN type transistor, and the second pole of the first switch Q1 is an emitter of the NPN type transistor. The second switch Q2 may be a PNP type transistor, the control pole of the second switch Q2 is a base of the PNP type transistor, the first pole of the second switch Q2 is a collector of the PNP type transistor, and the second pole of the second switch Q2 is an emitter of the PNP type transistor.

In this embodiment, there is a diode and gain feature between the base and the emitter of the first switch Q1, so the first switch Q1 can rectifier the voltage dividing signal and regulate impedance of the voltage dividing signal. Then, the DC signal is generated after filtering by the third capacitor C3. The first resistor R1 acts as a discharging circuit of the third capacitor C3. The first switch Q1 and the second switch Q2 are located near or are encapsulated together, so temperature feature of the first switch Q1 and the second switch Q2 is the same. In addition, change of voltage between the base and the emitter of the second switch Q2 restrains change of voltage between the base and the emitter of the first switch Q1, thus, the second switch Q2 can do voltage and temperature compensations to make the high voltage DC output power Vo stable.

The first switch Q1 and the second switch Q2 have low current, so the first switch Q1 and the second switch Q2 have lower loss than that of diodes. In addition, the first switch Q1 has gain feature that can be used to regulate impedance of the voltage dividing signal, therefore, the load effect with different high voltage DC output power Vo is reduced.

The power supply system 10 uses lossless element to generate the voltage dividing signal, which decreases loss of the power supply system 10 and increases efficiency of the power supply system 10. In addition, the voltage dividing signal is rectified by transistors, which further decreases loss of the power supply system 10. Furthermore, the power supply system 10 uses the change of voltage between the base and the emitter of the PNP type transistor to restrain the change of voltage between the base and the emitter of the NPN type transistor, to do voltage and temperature compensation to the rectified voltage dividing signal, resulting in stable high voltage DC output power Vo.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A power supply system, comprising an electromagnetic interference (EMI) filter circuit, a rectifier and filter circuit, a switch circuit, and a transformer connected in series, and a feedback circuit and a controller connected in series between an output of the transformer and the switch circuit, wherein the feedback circuit comprises:
    a voltage divider circuit, connected between the output of the transformer and the ground to generate a voltage dividing signal, wherein the voltage divider circuit comprises a first lossless element and a second lossless element connected in series between the output of the transformer and the ground, and the voltage dividing signal is generated at a node of the first lossless element and the second lossless element;
    a filter circuit, connected to the node of the first lossless element and the second lossless element, to filter the voltage dividing signal into a direct current (DC) signal; and
    a voltage and temperature compensation circuit, connected to the filter circuit, to do voltage compensation and temperature compensation to the DC signal to generate a feedback signal, and to send the feedback signal to the controller.

2. The power supply system of claim 1, wherein the first lossless element and the second lossless element are both capacitors.

3. The power supply system of claim 2, wherein the filter circuit comprises:
    a first switch, comprising a control pole, a first pole, and a second pole, the control pole receiving the voltage dividing signal, and the first pole receiving a reference voltage;
    a first capacitor, connected between the second pole of the first switch and the ground; and
    a first resistor, connected to the first capacitor in parallel.

4. The power supply system of claim 3, wherein the first switch is a NPN type transistor, the control pole is a base of the NPN type transistor, the first pole is a collector of the NPN type transistor, and the second pole is an emitter of the NPN type transistor.

5. The power supply system of claim 3, wherein the voltage and temperature compensation circuit comprises:
    a second switch, comprising a control pole, a first pole, and a second pole, wherein the control pole of the second switch is connected to the second pole of the first switch to receive the DC signal, the first pole of the second switch is grounded, and the second pole of the second switch outputs the feedback signal to the controller; and
    a second resistor, with one end connected to the second pole of the second switch and the other end receiving the reference voltage.

6. The power supply system of claim 5, wherein the second switch is a PNP type transistor, the control pole of the second switch is a base of the PNP transistor, the first pole of the second switch is a collector of the PNP transistor, and the second pole of the second switch is an emitter of the PNP transistor.

7. A feedback circuit for a power supply system that comprises a controller and a series connection of an electromagnetic interference (EMI) filter circuit, a rectifier and filter circuit, a switch circuit, and a transformer, the feedback circuit connected in series with the controller between an output of the transformer and the switch circuit, wherein the feedback circuit comprises:
    a voltage divider circuit, connected between the output of the transformer and the ground to generate a voltage dividing signal, wherein the voltage divider circuit comprises a first lossless element and a second lossless element connected in series between the output of the transformer and the ground, and the voltage dividing signal is generated at a node of the first lossless element and the second lossless element;
    a filter circuit, connected to the node of the first lossless element and the second lossless element, to filter the voltage dividing signal into a direct current (DC) signal; and
    a voltage and temperature compensation circuit, connected to the filter circuit, to do voltage compensation and temperature compensation to the DC signal to generate a feedback signal, and to send the feedback signal to the controller.

8. The feedback circuit of claim 7, wherein the first lossless element and the second lossless element are both capacitors.

9. The feedback circuit of claim 8, wherein the filter circuit comprises:
- a first switch, comprising a control pole, a first pole, and a second pole, the control pole receiving the voltage dividing signal, and the first pole receiving a reference voltage;
- a first capacitor, connected between the second pole of the first switch and the ground; and
- a first resistor, connected to the first capacitor in parallel.

10. The feedback circuit of claim 9, wherein the first switch is a NPN type transistor, the control pole is a base of the NPN type transistor, the first pole is a collector of the NPN type transistor, and the second pole is an emitter of the NPN type transistor.

11. The feedback circuit of claim 9, wherein the voltage and temperature compensation circuit comprises:
- a second switch, comprising a control pole, a first pole, and a second pole, wherein the control pole of the second switch is connected to the second pole of the first switch to receive the DC signal, the first pole of the second switch is grounded, and the second pole of the second switch outputs the feedback signal to the controller; and
- a second resistor, with one end connected to the second pole of the second switch and the other end receiving the reference voltage.

12. The feedback circuit of claim 11, wherein the second switch is a PNP type transistor, the control pole of the second switch is a base of the PNP transistor, the first pole of the second switch is a collector of the PNP transistor, and the second pole of the second switch is an emitter of the PNP transistor.

* * * * *